United States Patent
Weber et al.

(10) Patent No.: US 11,313,448 B2
(45) Date of Patent: Apr. 26, 2022

(54) HARMONIC DRIVE

(71) Applicant: Schaeffler Technologies AG & Co. KG, Herzogenaurach (DE)

(72) Inventors: Jurgen Weber, Erlangen (DE); Marco Hildebrand, Nuremberg (DE); Daniel Heise, Herzogenaurach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 320 days.

(21) Appl. No.: 16/626,631

(22) PCT Filed: May 16, 2018

(86) PCT No.: PCT/DE2018/100467
§ 371 (c)(1),
(2) Date: Dec. 26, 2019

(87) PCT Pub. No.: WO2019/001613
PCT Pub. Date: Jan. 3, 2019

(65) Prior Publication Data
US 2020/0116246 A1  Apr. 16, 2020

(30) Foreign Application Priority Data
Jun. 27, 2017 (DE) .......................... 102017114175.8

(51) Int. Cl.
*F16H 49/00* (2006.01)
*F01L 1/02* (2006.01)
(Continued)

(52) U.S. Cl.
CPC .............. *F16H 49/001* (2013.01); *F01L 1/02* (2013.01); *F16D 7/002* (2013.01); *F16D 7/021* (2013.01); *F16H 2049/003* (2013.01)

(58) Field of Classification Search
CPC .. F16H 49/001; F16H 2049/003; F16D 7/002; F01L 1/02
See application file for complete search history.

(56) References Cited

U.S. PATENT DOCUMENTS 4,969,376 A   11/1990  Fickelscher
5,417,186 A *  5/1995  Elrod .................. F01L 13/0057
                                              123/90.17
(Continued)

FOREIGN PATENT DOCUMENTS

DE        3738521       12/1988
DE       10027539       12/2001
(Continued)

*Primary Examiner* — Terence Boes
(74) *Attorney, Agent, or Firm* — Volpe Koenig

(57) ABSTRACT

A harmonic drive including a housing component (4) and a drive element (18) which is held on the housing component, can be deformed by a wave generator (14), is in the form of a flanged bushing and has a toothing region (17) having a cylindrical basic shape and a disc section (19) which adjoins the toothing region (17). Adjoining the disc section (19) there is a bushing section (20) which is concentric to the toothing region (17), overlaps the latter in the axial direction and is held interlockingly between a cylindrical edge section (21), which is thick-walled in comparison with the bushing section (20), of the housing component (4) and an intrinsically rigid component (22) which is likewise solid in comparison with the flanged bushing (18).

18 Claims, 2 Drawing Sheets

(51) Int. Cl.
    *F16D 7/00*         (2006.01)
    *F16D 7/02*         (2006.01)

(56) References Cited

U.S. PATENT DOCUMENTS

| | | | |
|---|---|---|---|
| 2011/0277713 A1* | 11/2011 | David | F01L 1/34 |
| | | | 123/90.15 |
| 2017/0101905 A1 | 4/2017 | Kohrs et al. | |
| 2019/0353059 A1* | 11/2019 | Weber | F16H 53/04 |
| 2019/0353237 A1* | 11/2019 | Weber | F01L 1/047 |
| 2020/0080448 A1* | 3/2020 | Weber | F01L 1/352 |
| 2020/0165944 A1* | 5/2020 | Weber | F01L 1/352 |

FOREIGN PATENT DOCUMENTS

| | | |
|---|---|---|
| DE | 102013216183 | 2/2015 |
| DE | 102014210360 | 12/2015 |
| DE | 102015210707 | 12/2016 |
| DE | 102016223474 | 3/2018 |
| EP | 0514829 | 11/1992 |
| WO | 2017041802 | 3/2017 |

\* cited by examiner

HARMONIC DRIVE

CROSS-REFERENCE TO RELATED APPLICATIONS

This application is a 371 National Phase of PCT/DE2018/100467, filed May 16, 2018, which claims the benefit of German Patent Application No. 10 2017 114 175.8, filed Jun. 27, 2017, both of which are incorporated by reference herein as if fully set forth.

BACKGROUND

The disclosure relates to a harmonic drive which can be used as an actuating mechanism and has a deformable drive element which is configured as a flanged bushing.

A harmonic drive of this type is known, for example, from WO 2017/041802 A1. This harmonic drive has an elastic gearwheel which is designed as a flanged bushing and is held on a housing in such a way that there is play to a different extent in different directions.

A further harmonic drive is known, for example, from DE 10 2015 210 707 B3. This harmonic drive has a drive unit which comprises a first and a second component. The two components of the drive unit are connected to one another in a positively locking manner in such a way that there is a rotational backlash between the two components. The positively locking connection with backlash is established by way of radially outwardly directed shaped elements of the second component which are distributed on the circumference of the second component and engage into cutouts in the first component. Spring elements can be arranged in the circumferential direction next to the shaped elements which are arranged in the cutouts.

DE 10 2013 216 183 A1 discloses a further harmonic drive which is provided for use in an adjusting device, namely an electric camshaft adjuster. In different embodiments of the harmonic drive, a flexible drive element is configured either as a pot-shaped element or as a flanged bushing. A cover which secures components of the harmonic drive in the axial direction is placed in front of the flanged bushing. The flanged bushing is fastened together with the cover to the housing of the harmonic drive by a screwed connection.

DE 10 2016 223 474 B3 discloses a harmonic drive having a flanged bushing which is held on its outer circumference via a toothed flange ring.

SUMMARY

The disclosure is based on the object of specifying a harmonic drive which is developed with respect to the prior art and is distinguished both by way of a compact, production-friendly construction and by a high operational reliability.

According to the disclosure, this object is achieved by way of a harmonic drive having one or more features of the disclosure. The harmonic drive comprises a housing component and a drive element which can be deformed by way of a wave generator, is configured as a flanged bushing, and has a toothing region with a cylindrical basic form. A flanged bushing is understood to mean a drive element which has a radially outwardly directed disk section (also called a flange or collar) which emanates from the cylindrical region, that is to say the toothing region. That bushing-shaped region of the flanged bushing which is denoted in its entirety as a toothing region is not necessarily completely toothed. There is preferably no toothing in that section of the toothing region which is adjoined by the collar.

According to the disclosure, the disk section of the flanged bushing is adjoined by a bushing section which is concentric with respect to the toothing region, overlaps with the latter in the axial direction, and is held in a positively locking manner between a cylindrical, thick-walled (in comparison with the bushing section) edge section of the housing component and a solid (likewise in comparison with the flanged bushing), inherently rigid component. In cross section, the inner bushing-shaped section, that is to say the toothing region, describes a U-shape together with the outer bushing section which is held in a positively locking manner on the housing of the harmonic drive and the flange which connects the two bushing-shaped, substantially cylindrical sections.

The connection which is formed between the bushing section of the flanged bushing and the housing component and the additional, solid (likewise in comparison with the flanged bushing) component is preferably a positively locking press joint. A connection of this type is distinguished by the possibility of efficient assembly and a very low space requirement, for instance in comparison with screwed connections. At the same time, there is a high fatigue strength as a result of the positively locking connection. The flanged bushing is preferably designed as a sheet metal part with a substantially uniform wall thickness apart from the toothed region.

In the case of low torques, relative rotating between the thin-walled flanged bushing and the two elements which are fixed on the housing is prevented first of all by way of a frictionally locking connection. If a torque which exceeds the holding torque which is produced with the aid of frictional forces is active, significant relative rotating between the annular element and the components which are fixed on the housing is therefore brought about. This relative rotating is limited by way of a positively locking connection between the bushing section of wave-shaped profiling and a corresponding counter-contour on the side of the housing. In this way, the connection between the annular element and the housing is of elastic design on the one hand, in order, in particular, to make slight slipping in the case of overloading possible, macroscopic slipping being prevented on the other hand by way of the wave shape and the rigidity of the thin-walled flanged bushing in interaction with the housing component. Furthermore, said design has the advantage that manufacturing tolerances of solid components which are fixed on the housing are compensated for by way of the elasticity which exists between the wave peaks of the thin-walled bushing section.

The flanged bushing and the components which enclose the flanged bushing radially do not bear against one another over the full circumference, but rather have, distributed over their circumference, a plurality of discrete supporting points or regions which are spaced apart from one another as contact faces. The contact faces between the flanged bushing and the radially outer and radially inner component are arranged, for example, so as to lie radially opposite one another in each case. They can also be arranged offset in the circumferential direction with respect to one another. In the case of the last-mentioned arrangement, they can also lie in the same radial plane. Further relative arrangements of the contact faces, in particular of an asymmetrical type, are likewise possible.

In accordance with a first possible design, the bushing section of the flanged bushing has a wave profile for establishing the positively locking press joint. Even a slight press fit between the profile faces is to be understood to be a positively locking press joint.

In accordance with a first variant of the positively locking press joint which is established by way of the wave profile, the wave profile has radial extreme points which bear against the housing component or against the further inherently rigid component. The extreme points are also called profile tips. A prestress of the flanged bushing between the solid components which are fixed on the housing can be achieved by way of the elasticity of the thin-walled bushing section.

In accordance with one alternative variant of a flanged bushing with a bushing section which is profiled in a wave-shaped manner, wave flanks of the wave profile bear against the housing component in a torque-transmitting manner. This variant is also called a flank-supporting variant. In this case, the flanged bushing is also designed as a component, in particular a sheet metal part, which is thin-walled in comparison with surrounding components which are fixed on the housing. The flanks of the bushing section which lie between extreme points, that is to say minima and maxima, of the wave profile are preferably clamped without backlash between tooth flanks of two solid components which are fixed on the housing. The lack of backlash of the connection between the flanged bushing and the housing component can be established by way of radial deformation of the housing component and/or of the further solid component which is fixed on the housing. Regardless of the rigidity of the flanged bushing, a torque can be transmitted without backlash between the flanged bushing and the housing of the harmonic drive in every operating state of the harmonic drive.

In accordance with a further possible refinement, the bushing section of the flanged bushing which is fastened to the housing component is configured as a tooth profile. Here, the connection between the flanged bushing and the housing component can be designed to be either rigid or resilient in the circumferential direction. In the last-mentioned case, that is to say in the case of a tangentially soft connection, the tooth profile of the flanged bushing preferably engages into toothing structures of the housing component and of the further part which is fixed on the housing, in such a way that a plurality of teeth of the housing component, and preferably also a plurality of teeth of the further component which is fixed on the housing, engage in each case into a single tooth gap of the profiled bushing section. The elastic resilience in the circumferential direction can be realized in this refinement by way of a tangential deformation of at least one solid component which is fixed on the housing. In this way, a compensation of relatively great tolerances can also be brought about, without deforming or loading components excessively in the radial direction.

The housing of the harmonic drive is not necessarily configured as a closed housing. The housing component which is connected to the flanged bushing by a positively locking press joint can be, for example, a housing shell, in particular in the case of a sheet metal housing, or another component which is connected fixedly to the housing. A cover which secures at least one component of the harmonic drive, in particular its wave generator, in the axial direction can be placed in front of the flanged bushing.

The component which is present in addition to the housing component, is likewise inherently rigid, and, together with the housing component, holds the flanged bushing in the harmonic drive in a positively locking manner is preferably designed as a disk. In one preferred refinement, this is an axial bearing washer which is configured for the axial support of an output internal gear which interacts directly with the flanged bushing. The axial bearing washer is optionally configured at the same time as an element for limiting the torsion angle between the housing and the output internal gear of the harmonic drive and therefore for limiting the adjusting range.

The harmonic drive can be used, for example, as an actuating mechanism of an electric camshaft adjuster. In this case, the housing of the harmonic drive can be rotated as a whole. The harmonic drive can likewise be used as an actuating mechanism of an apparatus for the variation of the compression ratio of a reciprocating piston engine, it not being possible for the housing of the harmonic drive to be rotated in this case.

BRIEF DESCRIPTION OF THE DRAWINGS

In the following text, a plurality of exemplary embodiments will be described in greater detail using the drawings, in which.

DETAILED DESCRIPTION

Unless indicated otherwise, the following remarks relate to all the embodiments. Parts which correspond to one another or in principle produce the same effect are labeled with the same designations in all the figures.

A harmonic drive which is labeled overall by the designation 1 is an actuating mechanism of an electric camshaft adjuster. With regard to the fundamental function of a harmonic drive in an electric camshaft adjuster, reference is made to the prior art cited at the outset.

Figure 1:
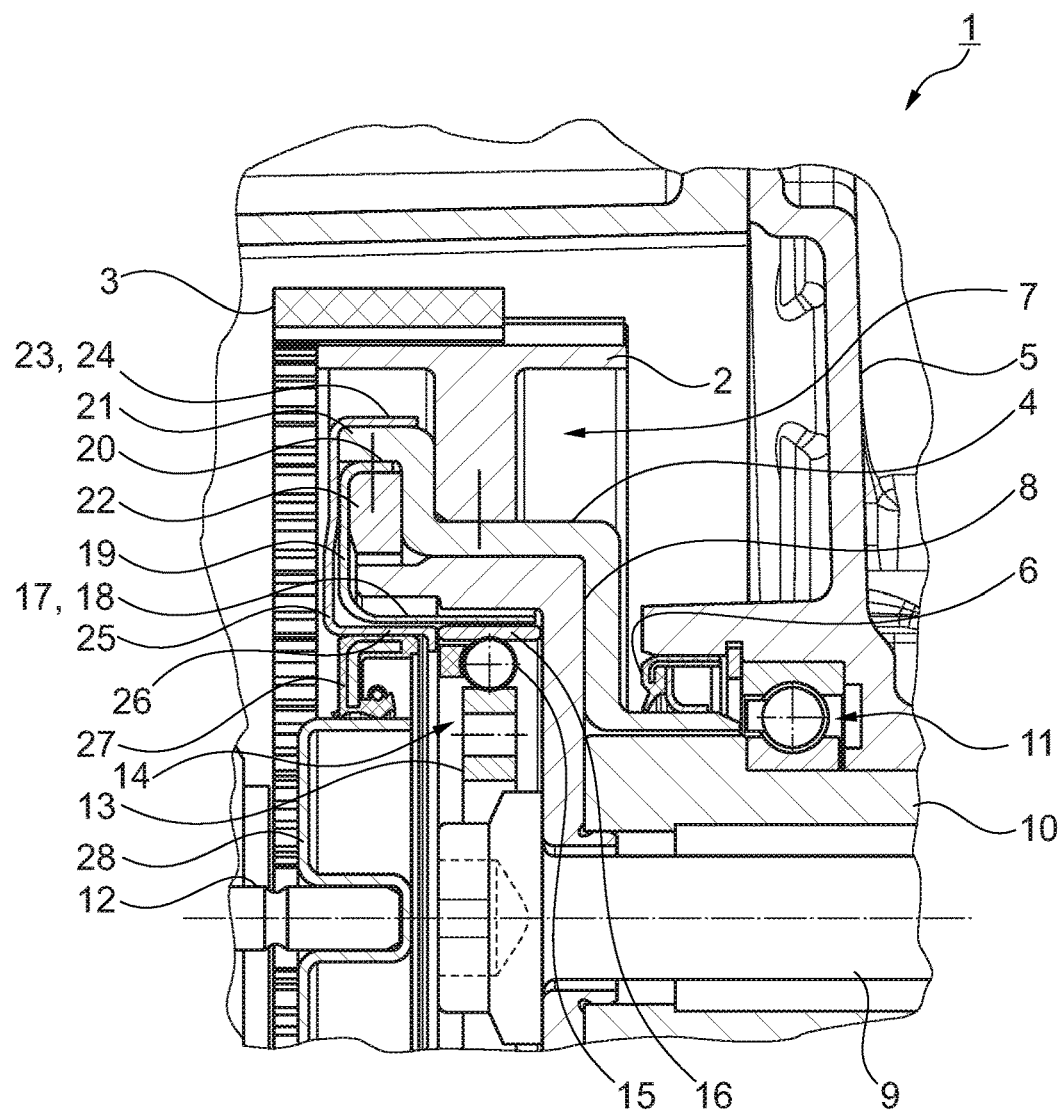
FIG. 1 shows details of a harmonic drive in a sectional illustration.

The harmonic drive 1 has a drive element 2 which is designed as a belt pulley. A toothed belt 3 drives the drive element 2 (which is a component of the harmonic drive 1, which component is fixed on the housing) in a manner known per se at half the crankshaft rotational speed. FIG. 1 shows the toothed belt 3 in a laterally shifted position on the drive element 2, in order to illustrate its tooth structure. The toothed belt 3 is actually situated centrally on the drive element 2.

The drive element 2 is connected fixedly to a housing component 4 which is pot-shaped overall and has multiple steps. The housing component 4 is sealed dynamically by means of a contact seal 6 with respect to a cylinder head 5 of an internal combustion engine.

An output internal gear 8 is mounted in the multiple-piece housing of the harmonic drive 1, which housing is labeled overall by the designation 7 and comprises the housing component 4 and the drive element 2, which output internal gear 8 is connected fixedly with the aid of a central screw 9 to the camshaft 10 to be adjusted. The camshaft 10 is mounted in the cylinder head 5, inter alia, with the aid of an anti-friction bearing 11, namely a ball bearing.

An adjusting shaft 12 which is driven by way of an electric motor (not shown) is coupled fixedly (optionally via a compensating coupling) to an inner ring 13 of a wave generator 14 so as to rotate with it, which wave generator 14 is to be assigned to the harmonic drive 1. In a design which is known per se, the inner ring 13 has a non-circular, elliptical shape, rolling bodies 15 (namely balls) which roll on the inner ring 13 forcing a resilient outer ring 16 into a non-round shape in accordance with the inner ring 13. As a result, an inner cylindrical section 17 of a flexible drive element 18 which is configured as a flanged bushing is likewise deformed, with the result that an external toothing system which is situated on the inner cylindrical section 17 is brought partially into engagement with an internal toothing system of the output internal gear 8. A different number of teeth of the external toothing system of the deformable drive element 18 on one side, the inner cylindrical section 17 of which is also called a toothing region, and of the internal toothing system of the output internal gear 8 on the other side ensures in a way which is known in principle that a complete revolution of the adjusting shaft 12 in relation to the drive element 2 is converted merely into a comparatively small pivoting motion between the output internal gear 8 and the drive element 2. This adjustment is synonymous with an adjustment of the phase position of the camshaft 10 in relation to the crankshaft of the internal combustion engine. No adjustment of the camshaft 10 takes place as long as the adjusting shaft 12 rotates at the rotational speed of the drive element 2.

The inner cylindrical section 17 of the flanged bushing 18 merges into a radially outwardly directed disk section 19 which is adjoined on the outer side by a bushing section 20 which is an outer cylindrical section which is concentric with respect to the inner cylindrical section 17 of the drive element 18, but is substantially shorter in the axial direction.

The bushing section 20 is situated radially directly within a likewise cylindrical edge section 21 of the inherently rigid housing component 4 which is solid in contrast to the flanged bushing 18. A disk 22 which is fixed on the housing is situated radially directly within the bushing section 20, which disk 22 is a further solid component of the harmonic drive 1, which component is fixed on the housing, which disk 22 has a stop function in the axial direction with respect to the output internal gear 8 and limits the torsion angle of the output internal gear 8 with respect to the housing 7.

The deformable drive element 18 can be fastened in different ways between the edge section 21 and the disk 22 by way of a positively locking press joint, as will be described in greater detail in the following text.

A bushing-shaped fastening section 23 (that is to say, a bushing section) which is formed by way of an annular cover 24 which is placed in front of the flanged bushing 18 can be seen on the outer side of the edge section 21 in FIG. 1.

The bushing section 23 is adjoined radially on the inside by a disk-shaped ring section 25 which is also called a disk section, protrudes radially to the inside beyond the disk section 19 of the flanged bushing 18, and merges at its inner edge into an inner, cylindrical stop section 26. The stop section 26 is a stop which is active in the axial direction with respect to the outer ring 16 and therefore with respect to the entire wave generator 14. A shaft sealing ring 27 can be seen on the inner side of the stop section 26, which shaft sealing ring 27 is a dynamic seal between the housing 7 of the harmonic drive 1 and an attachment piece 28 which is connected fixedly to the adjusting shaft 12 and rotates together with the inner ring 13. The housing 7 is therefore sealed completely.

Figure 2:
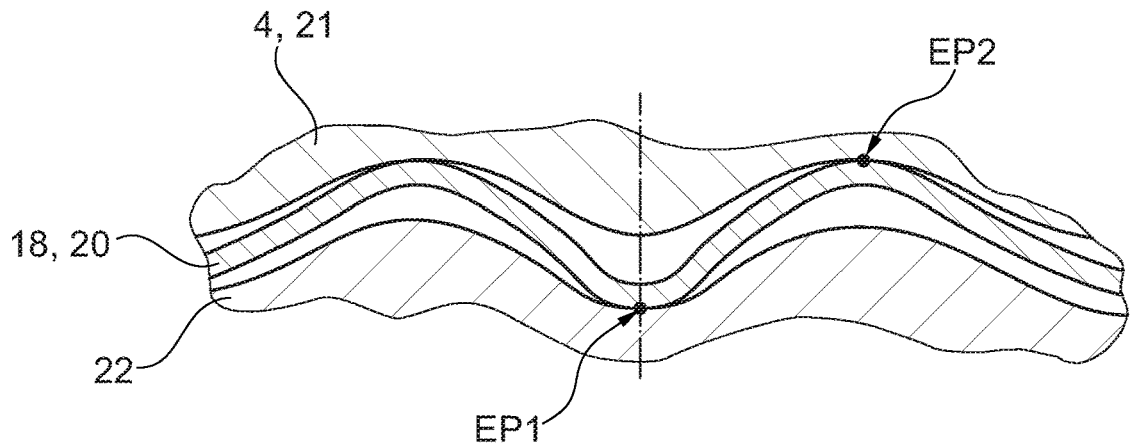
FIG. 2 shows details of a positively locking press joint between components of the harmonic drive according to FIG. 1.

Reference is made in the following text to FIG. 2 with regard to the connection between the deformable drive element 18, the housing component 4 and the disk 22, that is to say the axial bearing washer. The bushing section 20 of the flanged bushing 18 is designed as a wave profile which is held under prestress in a positively locking manner between likewise wave-shaped contours of the housing component 4 and the disk 22. Here, extreme points EP1, EP2 (that is to say, minima and maxima of the wave profile) bear against corresponding extreme points of the disk 22 or the housing component 4. Otherwise, the bushing section 20 is raised both from the housing component 4 and from the disk 22. If a torque acts between the housing component 4 and the disk 22 and/or the flanged bushing 18, this can first of all be absorbed by way of the frictionally locking connection which exists between the parts 4, 18, 22, without relative rotating occurring between the housing component 4 and the disk 22 and/or the drive element 18.

In the case of a rise in the torque beyond the range which can be absorbed solely by way of a frictionally locking connection, relative rotations occur between the components 4, 18, 22, which relative rotations are limited in a positively locking way, however, by way of the wave shape of the bushing section 20 and the corresponding shapes of the housing component 4 and the disk 22. There is therefore mounting of the flexible drive element 18 in the housing 7, which mounting is firstly soft in the circumferential direction and cushions load peaks, and is secondly positively locking.

Figure 3:
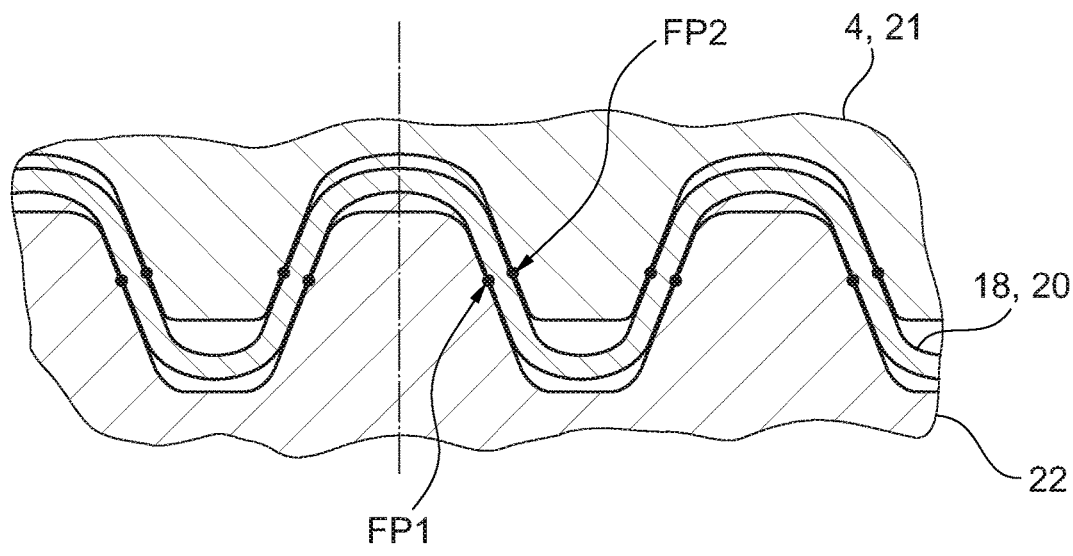
FIG. 3 shows an alternative press joint for the harmonic drive according to FIG. 1.

FIG. 3 outlines an alternative design of the connection between the housing component 4, the flanged bushing 18 and the disk 22 which is likewise suitable for the harmonic drive 1 according to FIG. 1. In this case, the bushing section 20 is likewise designed as a wave profile, there not being a contact between the bushing section 20 and the components 4, 22 which are fixed on the housing, however, at extreme points, but rather at flank points FP1, FP2. In this way, the deformable drive element 18 is fixed without backlash in the circumferential direction by way of a positively locking press joint between the housing component 4 and the disk 22. The disk 22 is therefore also fixed in the housing 7. A tolerance compensation by way of slightly elastic properties of the housing component 4 and of the disk 22 is possible in the radial direction.

Figure 4:
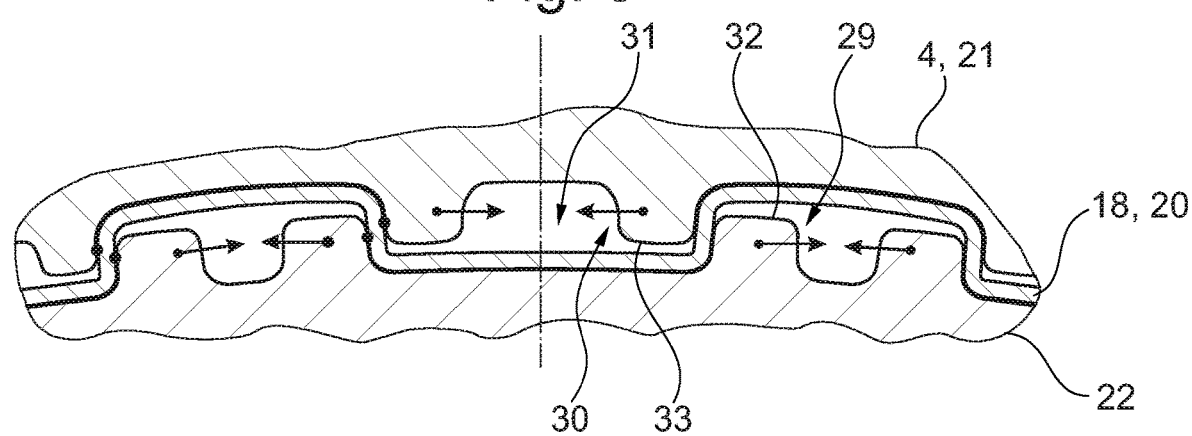
FIG. 4 shows a further possible design of a press joint for the harmonic drive according to FIG. 1.

The variant according to FIG. 4 differs from the variants according to FIG. 2 and FIG. 3 in that the bushing section 20 describes a right-angled tooth profile. Toothing systems 29, 30 are also formed by way of the housing component 4 and by way of the disk 22, said toothing systems 29, 30 having a finer pitch than the bushing section 20. In this way, two adjoining (in the circumferential direction) teeth of the toothing system 29 and the toothing system 30 engage together at all times into a tooth gap 31 of the bushing section 20. Those teeth of the toothing systems 29, 30 which are denoted by 32, 33 have a significant resilience in the circumferential direction of the components 4, 22, with the result that the flexible drive element 18 is clamped in between the housing component 4 and the disk 22 not only in a positively locking manner, but rather also under prestress which acts in the tangential direction. Possible tangential deflections of the teeth 22, 23 are illustrated by way of arrows in FIG. 4. By way of said possible tangential deflections, the entire drive element 18 is also fastened in the housing 7 in a tangentially soft manner at least to a small extent.

The connection between the bushing-shaped fastening section 23 of the cover 24 and the edge section 21 which is fixed on the housing is designed as a simple press-fit connection in the design according to FIG. 1. Each of the geometric designs which are shown in FIGS. 2 to 4 and by way of which there is in each case a positively locking press joint is likewise suitable for the attachment of the cover 24 to the housing 7.

Figure 5:
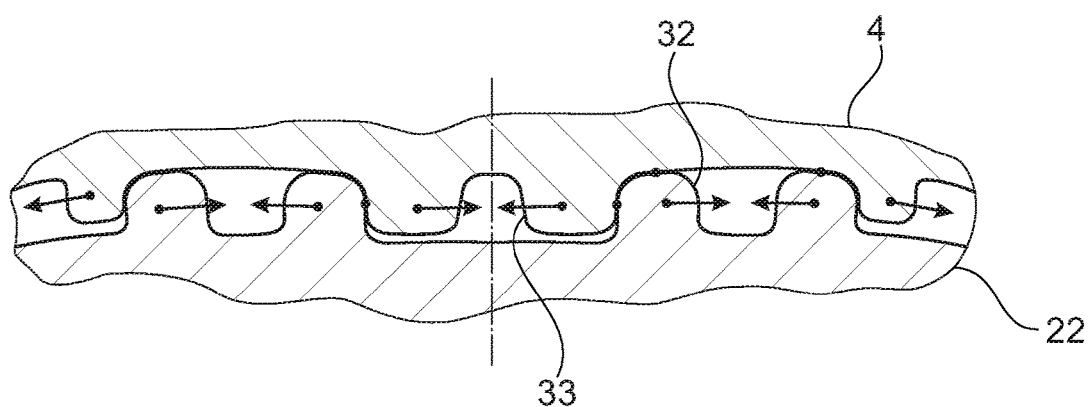
FIG. 5 shows an unclaimed press joint between components of a harmonic drive which are fixed on the housing for the explanation of preliminary considerations in conjunction with FIG. 4.

FIG. 5 illustrates a fundamentally conceivable direct connection between the housing component 4 and the disk 22, the contouring of the two components 4, 22 which are fixed on the housing corresponding to the design according to FIG. 4. In the case of FIG. 5, in a deviation from FIG. 4, the disk 22 can be designed as an internally toothed drive internal gear which interacts directly with a deformable drive element 18 (not shown here). There is also a significant elastic resilience of the positively locking press joint in the circumferential direction of the housing component 4 and of the disk 22 in the case outlined in FIG. 5, as a result of slight resilience of the teeth 32, 33 which are formed by way of the disk 22 and the housing component 4; higher requirements of the geometric precision of the components 4, 22 are to be met in comparison with the design according to FIG. 4.

LIST OF DESIGNATIONS

1 Harmonic drive
2 Drive element
3 Toothed belt
4 Housing component
5 Cylinder head
6 Seal
7 Housing
8 Output internal gear
9 Central screw
10 Camshaft
11 Anti-friction bearing
12 Adjusting shaft
13 Inner ring
14 Wave generator
15 Rolling bodies
16 Outer ring
17 Inner cylindrical section, toothing region
18 Flanged bushing, flexible drive element, annular element
19 Disk section
20 Bushing section
21 Edge section
22 Disk, solid component
23 Bushing-shaped fastening section
24 Cover, annular element
25 Ring section, disk section
26 Stop section
27 Shaft sealing ring
28 Attachment piece
29 Toothing system
30 Toothing system
31 Tooth gap
32 Tooth
33 Tooth
EP1, EP2 Extreme point
FP1, FP2 Flank point

The invention claimed is:
1. A harmonic drive, comprising:
a housing component;
a drive element held on said housing component, said drive element is deformable by way of a wave generator, is configured as a flanged bushing, and has a toothing region with a cylindrical basic form and a disk section which adjoins the toothing region;
a bushing section adjoins the disk section, the bushing section is concentric with respect to the toothing region, overlaps the toothing region in an axial direction, is held in a positively locking manner between a cylindrical, thick-walled, in comparison with the bushing section, edge section of the housing component and a solid, in comparison with the flanged bushing, inherently rigid component, and is adapted to permit a relative rotation in the case of high torques up to a positively locking connection between the bushing section and the housing component or the rigid component.

2. A harmonic drive comprising:
a housing component;
a drive element held on said housing, said drive element is deformable by way of a wave generator, is configured as a flanged bushing, and has a toothing region with a cylindrical basic form and a disk section which adjoins the toothing region;
a bushing section adjoins the disk section, the bushing section is concentric with respect to the toothing region, overlaps with the toothing region in an axial direction, is held in a frictionally locking manner, in case of low torques, between a cylindrical, thick-walled, in comparison with the bushing section, edge section of the housing component and a solid, in comparison with the flanged bushing, inherently rigid component, and is adapted to permit a relative rotation in case of high torques up to a positively locking connection between the bushing section and the housing component or the rigid component.

3. The harmonic drive as claimed in claim 1, wherein the bushing section has a wave profile.

4. The harmonic drive as claimed in claim 3, wherein the wave profile has radial extreme points which bear against the housing component and against the solid, inherently rigid component.

5. The harmonic drive as claimed in claim 3, wherein the wave profile has flank points which make contact with the housing component and the solid, inherently rigid component.

6. The harmonic drive as claimed in claim 1, wherein the bushing section is configured as a tooth profile.

7. The harmonic drive as claimed in claim 6, wherein a tooth profile of the deformable drive element engages into a toothing structure of the housing component, a plurality of teeth of the housing component engaging into a single tooth gap of the bushing section of the deformable drive element.

8. The harmonic drive as claimed in claim 1, wherein a disk is provided as the solid, inherently rigid component which, together with the housing component, fixes the bushing section of the deformable drive element by a positively locking press joint.

9. The harmonic drive as claimed in claim 8, wherein the disk is configured as an axial bearing washer for axial support of an output internal gear which interacts directly with the deformable drive element or as a rotational angle limiting disk which interacts with the output internal gear.

10. The harmonic drive as claimed in claim 1, wherein the harmonic drive forms an actuating mechanism of an internal combustion engine.

11. The harmonic drive as claimed in claim 2, wherein the bushing section has a wave profile.

12. The harmonic drive as claimed in claim 11, wherein the wave profile has radial extreme points which bear against the housing component and against the solid, inherently rigid component.

13. The harmonic drive as claimed in claim 11, wherein the wave profile has flank points which make contact with the housing component and the solid, inherently rigid component.

14. The harmonic drive as claimed in claim 2, wherein the bushing section is configured as a tooth profile.

15. The harmonic drive as claimed in claim 14, wherein a tooth profile of the deformable drive element engages into a toothing structure of the housing component, a plurality of teeth of the housing component engaging into a single tooth gap of the bushing section of the deformable drive element.

16. The harmonic drive as claimed in claim 2, wherein a disk is provided as the solid, inherently rigid component which, together with the housing component, fixes the bushing section of the deformable drive element by a positively locking press joint.

17. The harmonic drive as claimed in claim 16, wherein the disk is configured as an axial bearing washer for axial support of an output internal gear which interacts directly with the deformable drive element or as a rotational angle limiting disk which interacts with the output internal gear.

18. The harmonic drive as claimed in claim 2, wherein the harmonic drive forms an actuating mechanism of an internal combustion engine.

\* \* \* \* \*